W. T. Williams,
Cage Trap.
No. 31,504. Patented Feb. 19, 1861.
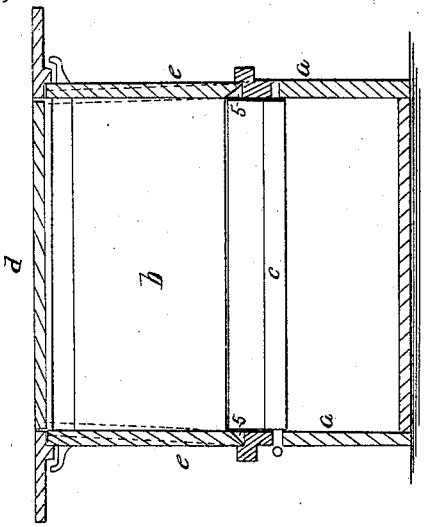
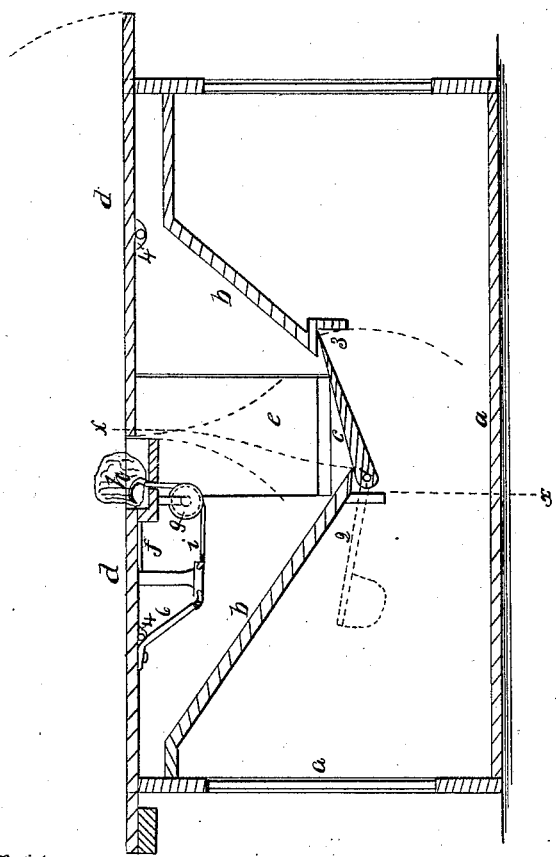
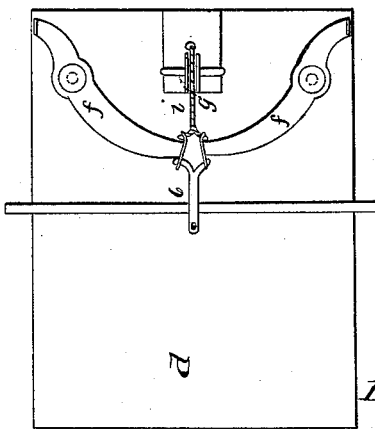
Witnesses.
Thos. Geo. Harold.
Chas. H. Smith.
Inventor
Wm. T. Williams

UNITED STATES PATENT OFFICE

WILLIAM T. WILLIAMS, OF NEW YORK, N. Y.

IMPROVEMENT IN ANIMAL-TRAPS.

Specification forming part of Letters Patent No. 31,504, dated February 19, 1861.

*To all whom it may concern:*

Be it known that I, WILLIAM T. WILLIAMS, of the city and State of New York, have invented, made, and applied to use a certain new and useful Improvement in Traps for Animals; and I do hereby declare that the following is a full, clear, and exact description of the nature of my said invention, reference being had to the annexed drawings, making part of this specification, wherein—

Figure 1 is a vertical longitudinal section, and Fig. 2 is a cross-section at the line $x\ x$.

Similar marks of reference denote the same parts.

Several traps for rats, mice, &c., have heretofore been constructed in which the weight of the animal causes the discharge of the trap and the delivery of the rat or mouse, either dead or alive, into a receptacle, the trap again setting itself. Other traps are dependent alone on the pull upon the bait for their discharge.

The nature of my said invention consists in swinging flaps, combined with supports that are pressed aside by the animal pulling upon the bait, so that the said flaps, being no longer supported, fall by the weight of the animal and deliver him into a receptacle below and the trap again sets itself. By this arrangement of devices I am able to construct a trap that can be inserted in the floor and is perfectly safe for persons or bodies passing so long as the bait is not pulled on, and as none of the parts rise above the level of the floor there is no obstruction and presents to the rat or other animal nothing to indicate the existance of a trap. The said trap might be affixed to the edge of a shelf or table and be equally efficient for catching rats or mice coming there.

In the drawings, $a$ is a box or receptacle of any desired character, at one end of which an opening and grating may be provided.

$b\ b$ are two inclined divisions forming a hopper, at the lower end of which is the valve $c$, set on a spindle 1, and provided with an arm 2 and counter-weight outside the box $a$. The valve $c$ sets up within the recess 3, so that any rats, mice, &c., within the box $a$ cannot draw down the moving edge of the valve for the purpose of escaping. The box $a$ is covered with the two flaps $d\ d'$, set on the centers 4 4, and so formed or weighted that they will always assume the horizontal position shown in Fig. 1, after the ends of the flaps coming together may have been depressed.

$e\ e$ are supports on each side of the box $a$, having a limited motion allowed their upper ends, as indicated by the dotted lines; and by the location of the points 5 upon which they move their weight causes them to fall toward each other to the foregoing limited extent when not otherwise acted upon; or a slight spring applied to each might insure this movement. These supports $e\ e$, taking beneath the flaps $d\ d'$ at their edges, effectually support said flaps and any weight upon them; but so soon as these supports are pressed outward said flaps will drop at the middle of the trap by the slightest weight. In order to press these supports back, I make use of the levers $f\ f$ (see inverted plan, Fig. 3) and cord $i$ over the pulley $g$ to the bait-hook $h$, so that upon the bait being pulled, as usual, in the attempts of animals to run off with the same, the flaps are liberated and swing down with the weight of the animal, delivering him upon the valve $c$, which falls and securely lodges him in the box. An india-rubber cord or small spring 6 draws back the levers $f\ f$, so that the trap sets itself by the supports $e\ e$ again falling under the edges of the flaps $d\ d$ as they return to a horizontal position.

What I claim, and desire to secure by Letters Patent, is—

1. The flaps $d\ d$ and levers $f\ f$, in combination with the supports $e\ e$, in the manner and for the purposes specified.

2. The valve $c$, in combination with the flaps $d\ d$ and supports $e\ e$, acting in connection with the receptacle $a$, as and for the purposes set forth.

In witness whereof I have hereunto set my signature this 11th day of January, 1861.

WM. T. WILLIAMS.

Witnesses:
THOS. GEO. HAROLD,
CHAS. H. SMITH.